(12) United States Patent
Marche et al.

(10) Patent No.: US 10,890,676 B2
(45) Date of Patent: Jan. 12, 2021

(54) SPECTROMETRY DEVICE

(71) Applicant: DETECTION TECHNOLOGY SAS, Moirans (FR)

(72) Inventors: Eric Marche, Moirans (FR); Silvère Lux, Moirans (FR)

(73) Assignee: DETECTION TECHNOLOGY SAS, Moirans (FR)

( * ) Notice: Subject to any disclaimer, the term of this patent is extended or adjusted under 35 U.S.C. 154(b) by 0 days.

(21) Appl. No.: 16/345,455

(22) PCT Filed: Oct. 25, 2017

(86) PCT No.: PCT/EP2017/077322
§ 371 (c)(1),
(2) Date: Apr. 26, 2019

(87) PCT Pub. No.: WO2018/077955
PCT Pub. Date: May 3, 2018

(65) Prior Publication Data
US 2019/0250288 A1 Aug. 15, 2019

(30) Foreign Application Priority Data

Oct. 27, 2016 (FR) .................................. 16 60418

(51) Int. Cl.
*G01T 1/36* (2006.01)
*G01T 1/24* (2006.01)
(Continued)

(52) U.S. Cl.
CPC .............. *G01T 1/36* (2013.01); *G01T 1/1642* (2013.01); *G01T 1/202* (2013.01); *G01T 1/24* (2013.01)

(58) Field of Classification Search
CPC .. G01T 1/36; G01T 1/24; G01T 1/202; G01T 1/1642
See application file for complete search history.

(56) References Cited

U.S. PATENT DOCUMENTS 4,198,986 A * 4/1980 Suzuki .................... G01T 1/171
250/369
4,543,530 A * 9/1985 Kovach ................ H03K 5/1532
327/15
(Continued)

FOREIGN PATENT DOCUMENTS

FR 2925170 6/2009
WO WO 2013/006453 A1 1/2013

OTHER PUBLICATIONS

International Search Report and Written Opinion for International Application No. PCT/EP2017/077322 dated Jan. 3, 2018.

*Primary Examiner* — David P Porta
*Assistant Examiner* — Djura Malevic
(74) *Attorney, Agent, or Firm* — Alston & Bird LLP

(57) ABSTRACT

Provided is a device for spectrometry of a radiation of photons, including a detector configured to receive the radiation and to deliver, at an output, an electrical signal that is a function of the radiation (X) received, a reference database that can be parameterised by means of a first parameter, a comparator configured to establish a comparison between the electrical signal and the reference signal, the comparator delivering a signal (E(t)) representative of the energy of each photon of the radiation and a quality factor (B(t)) of the comparison, and a feedback loop enabling the first parameter of the reference database to be adapted so as to optimise the quality factor (B(t)).

19 Claims, 5 Drawing Sheets

(51) Int. Cl.
*G01T 1/164* (2006.01)
*G01T 1/202* (2006.01)

(56) References Cited

U.S. PATENT DOCUMENTS

| | | | | |
|---|---|---|---|---|
| 4,591,984 A * | 5/1986 | Mori | ............... | G01T 1/171 250/363.02 |
| 5,233,180 A * | 8/1993 | Tsuruta | ............... | H03K 17/785 250/208.1 |
| 5,821,538 A * | 10/1998 | De Antoni | ............... | G01T 1/17 250/370.01 |
| 5,854,489 A * | 12/1998 | Verger | ............... | G01T 1/17 250/370.06 |
| 6,211,664 B1 * | 4/2001 | Bonnefoy | ............... | G01T 1/17 250/370.01 |
| 6,420,710 B1 * | 7/2002 | Verger | ............... | G01T 1/247 250/370.06 |
| 6,822,506 B2 * | 11/2004 | Binkley | ............... | H03K 5/1536 327/551 |
| 6,940,589 B1 * | 9/2005 | Suyama | ............... | G01J 1/44 250/214 VT |
| 7,459,688 B2 * | 12/2008 | Aoki | ............... | G01T 1/249 250/363.03 |
| 7,615,753 B2 * | 11/2009 | Audebert | ............... | G01T 1/17 250/370.07 |
| 7,705,308 B2 * | 4/2010 | Suzuki | ............... | H01L 27/14649 250/338.1 |
| 7,818,047 B2 * | 10/2010 | Tumer | ............... | G01T 1/2985 250/363.03 |
| 8,237,128 B2 * | 8/2012 | Steadman Booker | ............... | G01T 1/2928 250/370.09 |
| 8,350,221 B2 * | 1/2013 | Steadman Booker | ............... | G01T 1/17 250/336.1 |
| 8,422,627 B2 * | 4/2013 | Kappler | ............... | G01T 1/24 378/19 |
| 8,748,832 B2 * | 6/2014 | Brambilla | ............... | G01T 1/241 250/370.01 |
| 8,890,082 B2 * | 11/2014 | Scott | ............... | G01T 1/247 250/370.09 |
| 9,046,614 B2 * | 6/2015 | Schmitt | ............... | G01T 1/17 |
| 9,182,500 B2 * | 11/2015 | Wang | ............... | G01T 1/17 |
| 9,291,724 B2 * | 3/2016 | Proksa | ............... | G01T 1/24 |
| 9,311,277 B2 * | 4/2016 | Rinkel | ............... | G06F 17/18 |
| 9,360,568 B2 * | 6/2016 | Montemont | ............... | G01T 7/005 |
| 9,628,105 B1 * | 4/2017 | Veeder | ............... | H04N 5/378 |
| 9,968,327 B2 * | 5/2018 | Chen | ............... | A61B 6/4208 |
| 10,078,009 B2 * | 9/2018 | Daerr | ............... | G01T 1/171 |
| 10,098,595 B2 * | 10/2018 | Surendranath | ............... | G01T 1/24 |
| 10,117,626 B2 * | 11/2018 | Fu | ............... | A61B 6/4208 |
| 10,199,990 B2 * | 2/2019 | Robert | ............... | G01J 5/24 |
| 10,261,195 B2 * | 4/2019 | Chappo | ............... | H04N 5/32 |
| 10,267,947 B2 * | 4/2019 | Guo | ............... | G01T 1/40 |
| 10,359,520 B2 * | 7/2019 | Ishii | ............... | G01T 1/208 |
| 2002/0098818 A1 * | 7/2002 | Yokogawa | ............... | H04B 10/6933 455/255 |
| 2003/0020517 A1 * | 1/2003 | Souchkov | ............... | H03K 5/02 327/65 |
| 2003/0226973 A1 * | 12/2003 | Beusch | ............... | G06F 3/05 250/370.09 |
| 2004/0188623 A1 * | 9/2004 | Breeding | ............... | G01T 1/2985 250/363.03 |
| 2005/0230632 A1 * | 10/2005 | Montemont | ............... | G01T 1/24 250/371 |
| 2010/0025589 A1 * | 2/2010 | Olcott | ............... | G01T 1/1647 250/363.03 |
| 2010/0078569 A1 * | 4/2010 | Jarron | ............... | A61B 6/037 250/363.04 |
| 2013/0082179 A1 * | 4/2013 | Fukui | ............... | G01J 1/46 250/338.3 |

\* cited by examiner

SPECTROMETRY DEVICE

CROSS-REFERENCE TO RELATED APPLICATIONS

This application is a national phase entry of International Application No. PCT/EP2017/077322, filed Oct. 25, 2017, which claims priority to French Patent Application No. 1660418, filed on Oct. 27, 2016, the entire contents of which are incorporated herein by reference.

The invention is situated in the field of imaging using ionizing radiation, for example using X or gamma beams. It applies to medical imaging and to non-destructive testing such as luggage inspection. It relates to a device for processing a flux of 5 photons.

X-ray imaging systems are in particular used for luggage inspection in airports or in secured locations. Such an imaging system comprises an X-ray radiation source subjecting luggage to a flux of X photons and a semiconductor detector receiving the X photons having passed through the luggage. Depending on the absorption of the X rays by the luggage, it is possible to analyze the content of the luggage. The analysis of the content of the luggage and the evaluation of its hazardousness are more or less complex and automated steps depending on whether the luggage is destined for the baggage compartment or is luggage transported by the cabin passenger. In both cases, X-ray imaging systems have the objective of detecting dangerous substances such as explosives and flammable material. With the evolution of requirements in the matter of security, it is becoming necessary to be able to determine any type of substance so as, for example, to identify the presence of several substances which, when combined together, can produce explosives.

This determination can be accomplished by means of spectrometric imaging devices allowing each individual photon (X rays, for example) of an image to be detected and to quantify its energy, so as to classify these photons in a histogram to construct an energy spectrum of the incident flux.

The detection of the X photons is accomplished by a detector which converts the energy deposited by the incident photos into an electrical signal. A detector comprises for example a crystal configured to transform the energy received from a photon into packets of charges, measured by a charge amplifier. Other detectors can, for example, comprise a scintillator associated with a photodiode or with a photomultiplier.

The quality of the spectrometry depends primarily on its aptitude to distinguish individual X photons from one another optimally. The maximum flux of photons that the detector can process while distinguishing the different photons depends essentially on the response time of the detector and of a processing chain disposed downstream of the detector.

In existing detectors, a considerable variation is noted in the response time due in particular to drift during the starting of the detector and over time. Considerable drift is also due to temperature variations of the detector.

To mitigate this problem, a stabilization step is resorted to during starting, a step which can last on the order of one hour or more depending on the temperature. It is also necessary to provide for regular stopping periods, which is very constraining in practice.

For certain detectors, a polarization signal is applied. In the case of a detector implementing a semiconductor crystal, the polarization signal is a high voltage.

It is, for example, known from document FR 2 925 170 A1 to dispose at the output of the detector a charge amplifier of the integrator type. The output signal of the amplifier is made to transit through a delay line and the signal leaving the delay line is subtracted from the signal leaving the amplifier directly. The amplitude of the output of the subtractor is then a function of the energy of each photon received by the detector. This energy measurement operates correctly as long as the duration of the delay line is greater than the duration of the signal front leaving the amplifier so as to distinguish by means of the subtractor the rise of the signal provided directly by the amplifier and the drop of the same signal inverted and delayed by the delay line.

However, if the duration of the delay line is less than that of the front leaving the amplifier, a telescoping occurs in the subtractor and the measurement of amplitude of the impulse underestimates very significantly the real amplitude of the signal front of the charge amplifier, and therefore the real energy deposited by the photon X. As this amounts to losing, in this case, a portion of the charges generated by the detector, the signal-to-noise ratio is strongly degraded. The correct measurement of the energy of a photon therefore necessitates a sufficiently large duration of the delay line.

Furthermore, to be able to optimally distinguish the individual photons from one another, a priori distributed randomly in time, and to correctly quantify the energy that each has deposited on the detector, the successive impulses must be as distinct as possible, therefore as short as possible. In other words, the greater the flux of photons, the shorter the duration of the delay line must be in order to allow the distinction of each of the photons.

These two constraints: measuring the energy of each photon and distinguishing each photon are thus antagonistic with regard to selecting the duration of the delay line. In practice, for a large photon flux, typically more than 1 million per second, it becomes impossible to determine a duration of the delay line allowing both sufficient distinction of the individual photons (resolution of coincidences), while still correctly quantifying the energy that each has deposited on the detector.

The invention aims to mitigate all or part of the problems cited above by proposing a spectrometry device allowing the detector to be stabilized, or at least correcting the effects of the instability of the detector.

To this end, the invention has as its object a spectrometry device for a beam of photons, the device comprising:
  a detector configured to receive the beam and to deliver at an output an electrical signal that is a function of the energy of each photon of the radiation received,
characterized in that the device also comprises:
  a reference database configurable by means of a first parameter,
  a comparator with two inputs and two outputs, the comparator receiving at its first input the electrical signal, and at its second input a reference signal delivered by the reference database, the comparator being configured to establish a comparison between the electrical signal and the reference signal, the comparator delivering at its first output a signal representing the energy of each photon of the beam and, at its second output, a quality factor of the comparison,
  a feedback loop allowing adapting the first parameter of the reference database so as to optimize the quality factor, the feedback loop intervening only to adjust the reference signal used allowing the energy of the later photons of the beam to be determined.

The comparator is advantageously configured to establish a comparison between the electrical signal that is a function of the energy of the current photon and the reference signal selected in the base as a function of a value of the first parameter defined based on the values of the quality factor delivered by the comparator receiving at its first input the electrical signal that is a function of the energy of the photos preceding the current photon, and giving at the output a signal representing the energy of the current photon.

In a first embodiment, the device also comprises an amplifier of the integrator type comprising one input and one output, the input of the amplifier being connected to the output of the detector. The reference database is then configured to generate several forms of signals, each corresponding to a front duration of a signal delivered by the amplifier in response to the reception of one photon by the detector.

The reference database is advantageously configured to associate with each form of signal a duration of the reference front forming the first parameter of the reference database, the feedback loop locking the duration of the reference front to the front duration of a signal delivered by the amplifier in response to the reception of a photon by the detector.

The signal representing the quality of the comparison is advantageously representative of a deviation between the front duration of a signal delivered by the amplifier and the duration of the reference front associated with the form of the signal received by the comparator. The feedback loop from the reference front duration to the duration of a signal delivered by the amplifier is configured to modify the reference front duration so as to change the reference form as a function of the value of the signal representing the quality of the comparison.

The feedback loop from the duration of the reference front to the front duration of a signal delivered by the amplifier can comprise a multiplier of the representative value by a gain constant and an adder adding a result originating from the multiplier to the current value of the reference front duration.

In the first embodiment, the device can also comprise:
  a subtractor with two inputs and one output, connected at
    a first of its inputs to the output of the amplifier, the output of the subtractor delivering the electrical signal,
  a delay line connected between the output of the amplifier and a second of the two inputs of the subtractor.

The delay line can be configurable by means of its delay duration and the reference database can be configurable by means of a second parameter formed by the delay duration.

In a second embodiment, the reference database delivers a temporal filter configured by a time constant. The comparison consists of applying the filter to the electrical signal, the signal representing the quality of the comparison being a difference between a rise time of the filtered signal and a reference rise time, the feedback loop tending to cancel the signal representing the quality of the comparison.

The detector can be polarized by means of a polarization signal and advantageously the device comprises a feedback loop of the polarization signal as a function of a deviation between a current first parameter and a nominal first parameter.

The feedback loop of the polarization signal can comprise a multiplier of the deviation between the current first parameter and the nominal first parameter by a gain constant and an adder adding a result originating in the multiplier to the current value of the polarization signal.

A time constant of the feedback loop of the polarization signal is advantageously stronger than a time constant of the feedback loop of the first parameter of the reference database.

The invention will be better understood and other advantages will appear upon reading the detailed description of an embodiment given by way of an example, a description illustrated by the appended drawing wherein.

For the sake of clarity, the same elements will bear the same labels in different figures.

Figure 1:
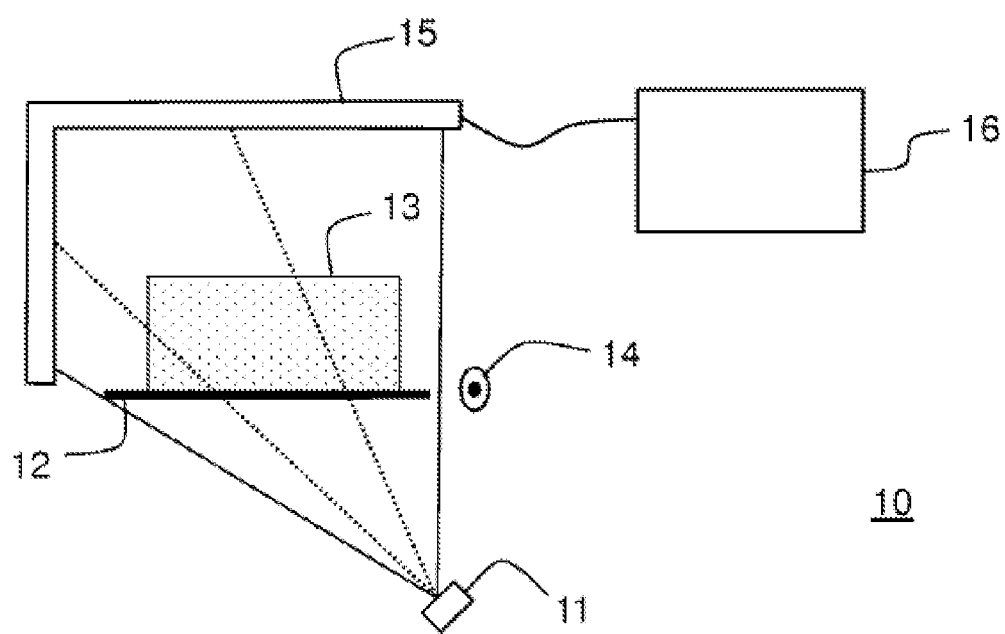
FIG. 1 shows an X-ray imaging system for luggage inspection.

FIG. 1 shows schematically an X-ray imaging system 10 for luggage inspection. The imaging system 10 comprises an X ray source 11, a conveyor belt 12 capable of transporting luggage 13 in the direction shown by the arrow 14, a semiconductor detector 15 and a processing device 16 connected to the detector 15. The detector 15 shown in FIG. 1 is an L-shaped linear detector. It comprises elements sensitive to X rays such as photodiodes or photoconductors disposed in two mutually perpendicular lines. The detector 15 can also be a two-dimensional detector and include a matrix of sensitive elements.

When a sensitive element of the detector 15 is exposed to an X photon, it converts this photon into a packet of charges of which the number is proportional to the energy of the photon. The X ray source 11 emits a flux of photons in the direction of the detector 15 through the conveyor belt 12. The spectrum of the X-ray flux received in the absence of objects is determined prior to the analysis of objects. Thus, by comparison of this spectrum with the spectrum of the flux of X rays received in the presence of an object to be analyzed, it is possible to determine the flux of X rays absorbed by the object to be analyzed.

It is well understood that the invention can be implemented in any form of photon radiation detector such as gamma radiation, and in other systems requiring spectrometry of a photon beam, such as for example medical imaging.

Figure 2:
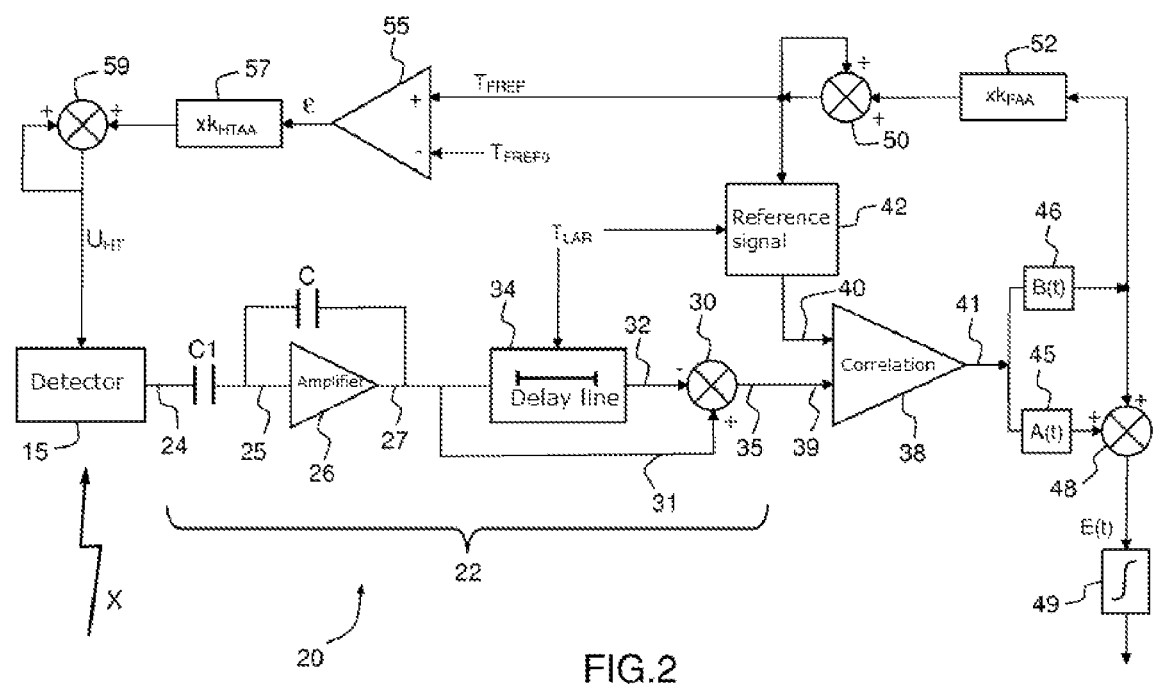
FIG. 2 shows schematically an example of a spectrometry device implementing the invention and installable in the system of FIG. 1.

FIG. 2 shows schematically an example of a spectrometry device 20 according to the invention and installed in the system 10.

The device 20 comprises a detector 15 and a processing chain 22 installed in the processing device 16. The detector 15 can comprise one or more sensitive elements. The device 20 can include a single processing chain 22 for all the sensitive elements of the detector 15, in which case the packets of charges originating from the different photosensitive elements are processed successively by the chain 22, or include a processing chain associated with each photosensitive element, in which cases the packets of charges are processed simultaneously by the different chains 22. So as not to overload the figure, we will use the example of a detector 15 comprising a single sensitive element which will be identified with the detector 15 which has an output 24 at which the packets of electrical charges are available to be read.

The detector 15 delivers an electrical signal representing the energy of each photon of the beam to which the detector 15 is sensitive. The processing chain has as its function to form the signal originating from the detector 15.

The processing chain 22 can be accomplished in the form of an integrated circuit suited for processing the charges originating in the detector. This type of integrated circuit is for example known in the literature by the name "ASIC," for "Application-Specific Integrated Circuit." It is also possible to use a programmable logic circuit known in particular in the literature under the name of FPGA, for "Field-Programmable Gate Array" or PLO for "Programmable Logic Device." It is also possible to implement a digital signal processor known in the literature by the name DSP for: "Digital Signal Processor." More generally, any circuit dedicated to the signal processing can be implemented to accomplish the processing chain 22.

The detector 15 can comprise a crystal allowing the conversion of photons into charges, such as in particular crystals of cadmium telluride (CdTe) or zinc-cadmium telluride (CdZnTe or CZT). These crystals convert the energy of photons into electrons. Alternatively, the detector 15 can comprise a scintillator associated with a photodiode or with a photomultiplier. The scintillator converts the incident photon beam into another photon beam with a longer wavelength than that to which the photodiode is sensitive. It is possible, for example, to implement rapid scintillators based on lutecium, such as lutecium oxyorthosilicate, known by the abbreviation "LSO", or lutecium-yttrium oxyorthosilicate, known by the abbreviation "LYSO."

The photomultiplier can be based on silicon, like for example those known by the abbreviation SiPM for its initials in the literature: "Silicon Photo-Multiplier" or MPPC: "Multi-Pixel Photon Counter."

FIG. 2 shows a spectrometry device in which the detector implements a crystal. In this variant, the processing chain 22 comprises an amplifier 26 of the integrator type comprising an input 25 and an output 27. The input 25 is connected to the output 24 of the detector 15, possibly by means of a decoupling capacitor C1. Another capacitor C is disposed between the input 25 and the output 27. It is possible to add a resistor in parallel with the capacitor C, which forms a negative feedback ensuring the integrator function of the amplifier 26.

The processing chain 22 can comprise a subtractor 30 associated with a delay line 34. A positive input 31 of the subtractor 30 is connected directly to the output 27 of the amplifier 26 and a negative input 32 [of the] subtractor 30 is connected to the output 27 of the amplifier 26 by means of a delay line 34. Disposed at the output 35 of the subtractor 30 is a signal formed by the difference between the signal originating in the amplifier and the same signal delayed by the delay line. It is possible to insert upstream of one of the inputs 31 and 32 of the subtractor a gain allowing balancing the levels of the signals received by the subtractor 30, particularly in the case where the delay line would cause weakening of the signal. The negative and positive terminals of the subtractor 30 can be inverted. The remainder of the processing will take this inversion into account.

According to the invention, the device 20 comprises a comparator 38 with two inputs 39 and 40 and an output 41. The input 39 receives the output signal of the subtractor 30 and the input 40 is connected to a reference database 42 of signal forms. The reference database 42 comprises several signal forms expected at the output of the subtractor 30. The signal forms correspond to different response times of the detector crystal 15. By selecting, for the signal forms contained in the reference database 42, different response times within an expected range and by distributing them with a constant pitch, it is possible to retrieve the real energy level of the photon received by the detector 15 thanks to a proximity between the real response time and one of the signals of the reference database 42.

The comparator 38 is configured to establish a correlation between a signal received from the subtractor 30 and one of the signals of the reference database 42. The correlation is a form of comparison accomplished by the comparator 38.

Figure 3A:
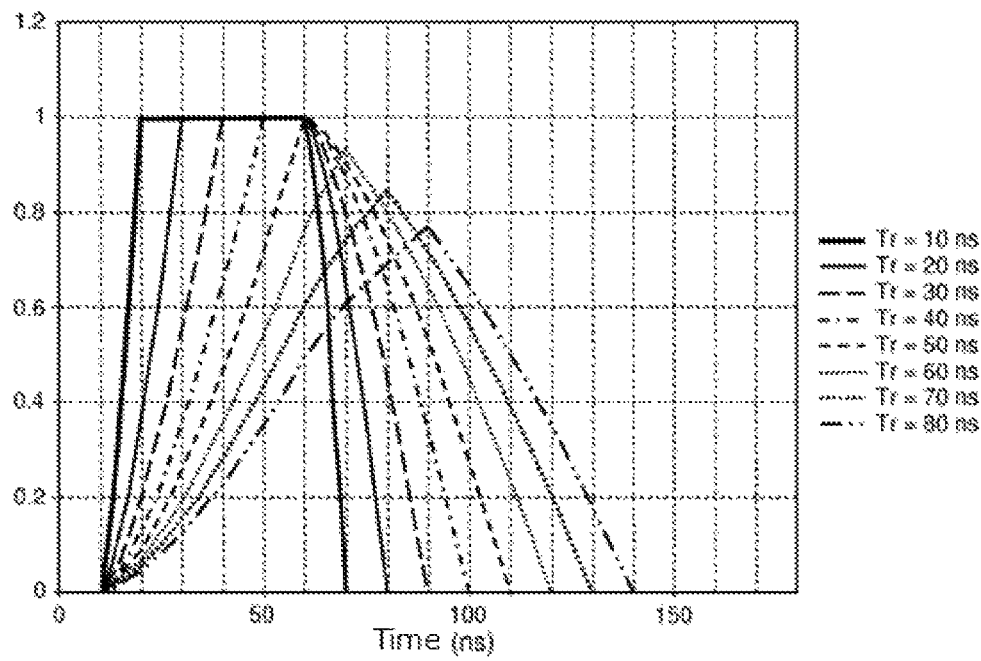
FIGS. 3a and 3b show examples of bundles of curves showing the amplitude at the ordinate of an output signal of a subtractor of the device.
Figure 3B:
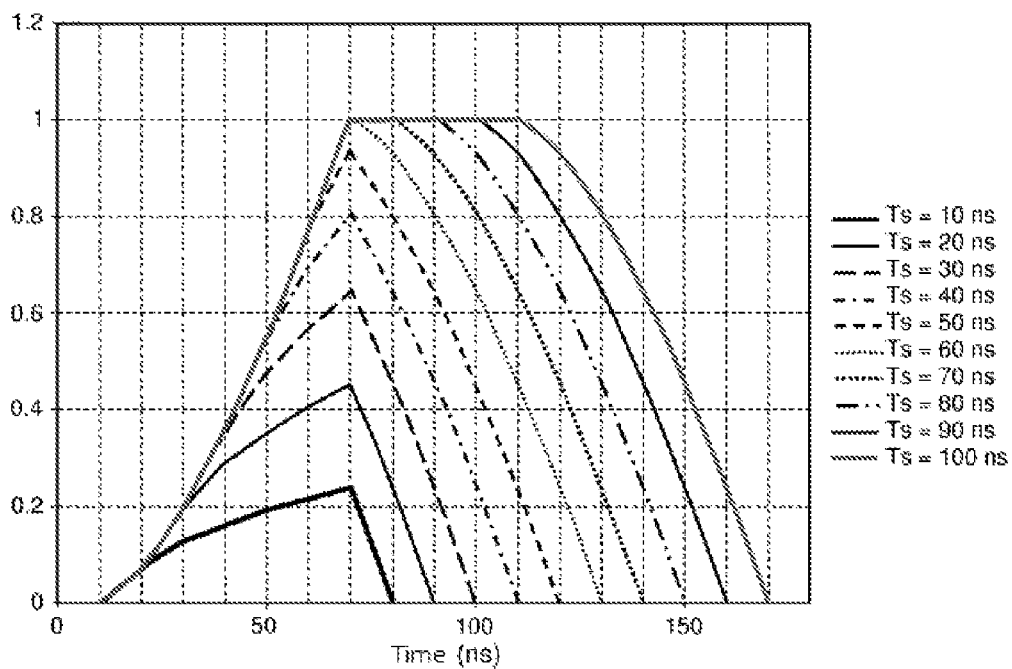

FIGS. 3a and 3b show two bundles of curves showing at the ordinate the amplitude of an output signal $U_p(t)$ of the subtractor 30 as a function of time represented on the abscissa. In these two figures, the amplitude has been normalized to 1 and the time is expressed in nanoseconds. In FIG. 3a, the duration of the delay line is fixed at 50 ns and each of the curves corresponds to the duration of a voltage front leaving the amplifier 26. The first curve corresponds to a voltage front lasting 10 ns and the last curve corresponds to a voltage front lasting 80 ns.

The voltage front is due to the detection of a photon by the detector 15. The duration of this front is a function of the passband of the amplifier 26, as well as the arrival kinetics of the charges at the input of the amplifier 26. This kinetics depends in particular on the characteristics of the detector 15, on its stabilization, on the temperature, on its supply voltage. FIG. 3a illustrates that, if the duration of the voltage front is greater than the duration of the delay line called $T_{LAR}$, the signal leaving the subtractor 30 cannot reach its maximum amplitude: 1 in FIG. 3a.

Likewise, in FIG. 3b the front duration is fixed at 60 ns and the different curves represent different values of the duration of the delay line 34. The same observation as based on FIG. 3a can be made based on FIG. 3b. By selecting the duration $T_{LAR}$ less than the front duration, the maximum amplitude of the signal is not reached.

Nevertheless, by storing in the reference database 42 different signal forms corresponding to different durations of the voltage front and possibly to different durations $T_{LAR}$ of the delay line, it is possible to compare the signal originating in the subtractor 30 with the reference signals to find the best correlation and thus arrive at the energy of the photon received by the detector 15. This comparison can give a good result even if the duration of the voltage front is greater than the duration of the delay line.

The reference forms can be theoretical forms, for example calculated from modeling of operation of the detector 15 and of the different components of the chain 22. It is also possible to define the form empirically by means of real measurements made on the device 20.

The reference signals stored in the reference database 42 can be digitized by steps, for example by 10 ns steps. A sampling of the signal $U_p(t)$ originating in the subtractor 30 is then carried out with the same step length. The comparison then consists of carrying out at each sampling period a statistical correlation calculation between the successive samples of the signal originating in the subtractor 30 and one of the reference forms stored in the base 42.

Figure 4:
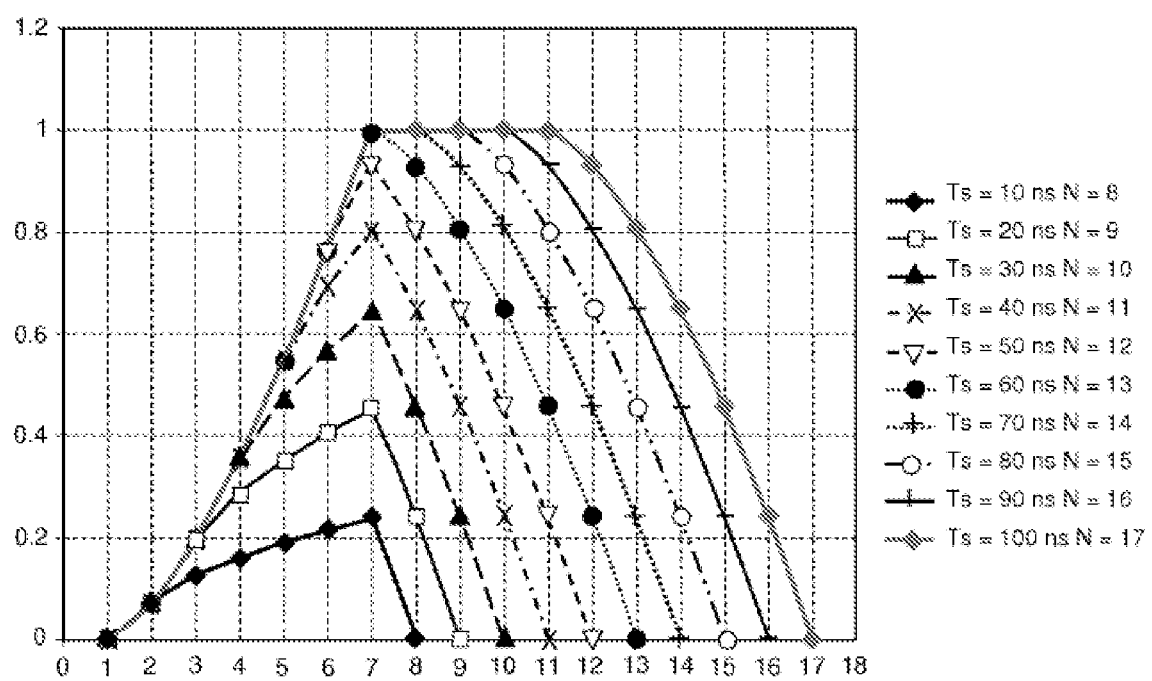
FIG. 4 shows an example of a bundle of digitized reference curves.

FIG. 4 shows an example of a bundle of digitized reference curves. This bundle of curves is similar to that of FIG. 3b. Digitizing has been carried out with a step size of 10 ns. Digitizing extends over N steps, 17 steps in this example.

The correlation calculation between the signal originating in the subtractor $U_p(t)$ and the reference forms can for example be likened to a linear regression calculated at each sampling period. For the reference form F(n) retained, n representing the sampling step length of the reference form and varying from 1 to N, the following two constant values are calculated:

An average of the reference form:

$$\overline{F} = \frac{1}{N}\sum_{n=1}^{N} F(n)$$

A variance of the reference form:

$$S_F^2 = \frac{1}{N}\sum_{n=1}^{N} (F(n) - \overline{F})^2$$

The calculation of the average $\overline{F}$ and of the variance $S_F^2$ can be accomplished in the reference database 42.

To process the impulsive signal $U_p(t)$ originating in the subtractor 30, the following calculations are performed in parallel at each value of time t, an integral multiple of the sampling period $T_{ECH}$ which is 10 ns in the example shown:

Average of $U_p$ at the instant t:

$$\overline{U_p}(t) = \frac{1}{N}\sum_{n=1}^{N} U_p(t - (N-n)T_{ECH})$$

Average of the square of $U_p$ at the instant t:

$$\overline{U_p^2}(t) = \frac{1}{N}\sum_{n=1}^{N} (U_p(t - (N-n)T_{ECH}))^2$$

Variance of $U_p$ at the instant t:

$$S_{U_p}^2(t) = \overline{U_p^2}(t) - (\overline{U_p}(t))^2$$

For each of the reference forms: the average of the product $F \cdot U_p$ at the instant t:

$$\overline{F \cdot U_p}(t) = \frac{1}{N}\sum_{n=1}^{N} F(n) \cdot U_p(t - (N-n)T_{ECH})$$

Covariance of F and $U_p$ at the instant t:

$$S_{FU_p}(t) = \overline{F \cdot U_p}(t) - \overline{F} \cdot \overline{U_p}(t)$$

Deduced from this for each time t, a multiple of $T_{ECH}$, is a correlation coefficient R(t) which is a function of time between $U_p(t)$ and F(t):

$$R(t) = \frac{S_{FU_p}(t) \cdot |S_{FU_p}(t)|}{S_F^2 \cdot S_{U_p}^2(t)}$$

The analysis of the variations of R(t) as a function of time t allows detecting the arrival of a front, and therefore of a photon. R(t) (non-dimensional) is at all times comprised between −1 and +1. It is considered that a front is detected each time R(t) shows a relative maximum (as a function of t) greater than a given threshold RS which is for example equal to 0.75. The reference curve F is then retained having the greatest value of R(t). In practice this value is close to 1.

The average, variance and covariance as well as the correlation coefficient causing the signal $U_p$ to intervene can be performed in the comparator 38.

The following three parameters are then calculated for each time t, a multiple of $T_{ECH}$:

A(t) shows the variation of amplitude of Up(t):

$$A(t) = \frac{S_{FU_p}(t)}{S_F^2}$$

B(t) shows the ordinate at the origin of the amplitude:

$$B(t) = \overline{U_p}(t) - A(t) \cdot \overline{F}$$

E(t) shows the energy of the photon:

$$E(t) = A(t) + B(t)$$

The amplitude of the front is then equal to E(t), t being the instant of the relative maximum of R(t). In FIG. 2 the principal functional blocks have been shown allowing these calculations to be performed. The calculation of A(t) is performed in a block 45 and the calculation of B(t) is accomplished in a block 46. The blocks 45 and 46 use information delivered by the comparator 38 at its output 41. A summer 48 receives the outputs of the blocks 45 and 46 and calculates E(t). The energy of a photon detected by the detector 15 and represented by the value E(t) is determined linearly without iteration through the processing chain 22 and the comparator 38 associated with blocks 45 and 46.

An integrator 49 receives, for each photon detected, the value E(t). The integrator 49 integrates in a histogram all the values of E(t) to obtain a spectrum of the energy of the photons received.

These calculations allow the correct quantification of the amplitude of the fronts, and therefore of the energy of the incident photons, even if the duration $T_{LAR}$ of the delay line 34 is less than the front duration $T_{FREF}$ retained for the reference forms F.

Moreover, as the calculations take into account the totality of the impulse $U_p(t)$, instead of a simple detection of the maximum value of this signal as in the prior art, the signal-to-noise ratio is further improved.

It is possible to simplify the calculations, in particular so as to simplify the processing chain 22. To accomplish this, it is possible to directly seek the relative maxima of E(t) as a function of t. Each maximum corresponds to a detected impulse, of which the front amplitude is given by the value of this maximum. This makes it possible to avoid having to calculate R(t) and $\overline{U_p^2}(t)$ and $S_{U_p}^2(t)$.

It is possible to further simplify the formulas by an approximate calculation by assuming that B(t)=0 a priori. The calculation is simpler but gives poorer results.

The correlation allowing the reference signal corresponding to the energy of the photon received by the detector 15 is better accomplished if the beginning of the front originating in the amplifier 26 truly corresponds to a zero value of the amplitude. Generally, the charge amplifier does not transmit the continuous component of the signal formed by the detector 15, due in particular to the fact of the presence of the decoupling capacitor C1, useful for dispensing with the leakage current of the detector 15. Consequently, the zero amplitude in the curves as shown in FIGS. 3*a* and 3*b* is not known. It is therefore necessary to make an offset correction in the amplitude, often called a baseline correction. This correction can be performed for example by forming an average, possibly a moving average, of the successive values of the signal between two impulses. A compensation for the cutoff frequency of the charge amplifier can also prove to be necessary. This cutoff frequency is due to the condenser C and to its series resistance present in the negative feedback of the amplifier 26.

There subsists a measurement error if the duration $T_{FREF}$ of the front retained for the reference form with which the calculations were performed differs from the duration $T_{FSIG}$ of the front at the output of the amplifier 26. This error is large in particular when $T_{LAR} < T_{FREF}$. More precisely, if the duration $T_{FSIG}$ of the front at the output of the amplifier 26 varies over time, particularly with temperature, the measurement loses stability. Advantageously, for reducing this error, the processing chain 22 is configured so that the reference database 42 generates several forms of signals, each corresponding to a duration front duration $T_{FSIG}$ of the signal delivered by the amplifier 26 in response to the reception of a photon by the detector 15.

The duration $T_{FREF}$ represents a first parameter of the reference database 42 and a single comparison is carried out by the comparator 38 between the electrical signal originating in the detector 15, formed by the processing chain 22, and one of the reference forms forming the reference signal. Alternatively, it is possible to configure the comparator 38 to carry out several comparisons between the electrical signal originating in the detector 15 and several reference forms. It is understood that the different reference form(s) compared for determining the energy of a photon will have been defined prior to the current comparison, by means of values of the quality factor B(t) established by the comparator 38 for the photons preceding the current photon.

As a complement, the delay line 34 can also be configurable by means of its delay duration $T_{LAR}$. Advantageously, the reference database 42 is also configurable by means of a second parameter formed by its delay duration $T_{LAR}$. Access to the reference forms retained for the correlation is then accomplished using matrices as a function of two parameters $T_{FREF}$ and $T_{LAR}$.

It has been noted that the value of the parameter B(t) representing the ordinate at the origin of the signal $U_p(t)$, is representative of the matching between the duration $T_{FSIG}$ of the front at the output of the amplifier 26 and the front duration $T_{FREF}$ of the reference forms. In other words, the parameter B(t) represents a quality factor of the correlation. More precisely, if the value of B(t) at the instant t of detection of an impulse is positive, the front duration $T_{FREF}$ of the reference form is shorter than the front duration $T_{FSIG}$ of the signal originating in the amplifier 26. In other words, if B(t)>0, then $T_{FREF} < T_{FSIG}$. Conversely, if the value of B(t) at the instant t of detection of an impulse is negative, the front duration $T_{FREF}$ of the reference form is longer than the front duration $T_{FSIG}$ of the signal originating in the amplifier 26. In other words, if B(t)<0, then $T_{FREF} > T_{FSIG}$.

When a front is detected more precisely by means of the calculation proposed above, when R(t) has a relative maximum as a function of t greater than a given threshold RS, the front duration $T_{FREF}$ of the reference form is corrected by means of an adder 50. More precisely, to the current value of $T_{FREF}$, the algebraic value of B(t) is added, to which is assigned a coefficient $k_{FAA}$ forming a positive gain constant. In other words:

$$T_{FREF} = T_{FREF} + k_{FAA} \times B(t)$$

A multiplier 52 allows multiplying the coefficient $k_{FAA}$ by B(t). More generally, the device 20 comprises a feedback loop from the reference front duration $T_{FREF}$ to the front duration $T_{FSIG}$. In the example shown, the feedback loop comprises the block 46 determining B(t) forming an error signal of the feedback loop, the multiplier 52 applying to B(t) the gain $k_{FAA}$ and the adder 50 correcting the duration of the reference front $T_{FREF}$ with B(t) to which its gain $k_{FAA}$ is assigned.

The feedback loop is used to refine the quantification of the energy E(t) of the photons received later by the detector 15. Internal tests have shown that the quantification of the energy of a photon becomes optimum after a number on the order of a few hundred to a few thousand photons have been received, for which the device has already determined the energy in a less accurate fashion. For a given photon, the determination of its energy does not use the feedback loop.

The coefficient $k_{FAA}$ is to be adjusted according to a compromise between stability and speed. The speed of convergence of $T_{FREF}$ to $T_{FSIG}$ must be proportional to the flux of photons received. Nevertheless, too great a speed risk rendering unstable the value of $T_{FREF}$. Upon starting, $T_{FREF}$ will be initialized at a typical value. Each time its value changes (at least to a significant degree), the reference forms F(n) are recalculated, as well as T and $S_F^2$. It is possible to retain the reference forms if the value of $T_{FREF}$ does not change significantly. In other words, as long as the value of $T_{FREF}$ does not exceed a predetermined threshold around its current value, the reference forms remain unchanged.

It is possible to refine the modification of the current value of $T_{FREF}$, by applying a correction of the proportional, integral and/or derivative type. The coefficients of this type of correction are determined so as to improve the stability/speed compromise.

When the duration of the reference form front $T_{FREF}$ has converged, it will conform to the average signal front duration $T_{FSIG}$. If the variations of $T_{FSIG}$ are slower than the speed of convergence of $T_{FREF}$, defined by the coefficient $k_{FAA}$, then $T_{FREF}$ will follow at all times the variations of $T_{FSIG}$, and the quantification of energy E(t) will remain accurate.

As mentioned above, the detector 15 can comprise several sensitive elements and the processing chain 22 can be common to different sensitive elements of the detector 15. Nevertheless, when there are several sensitive elements (or pixels), the value of $T_{FREF}$ can be particular to each sensitive element, or common to several sensitive elements. If the characteristics of several sensitive elements are sufficiently close, it is possible to share the same value of $T_{FREF}$ in the different sensitive elements. This allows a more rapid convergence by the sharing of the photons detected by the different sensitive elements.

Advantageously, a permitted range of values of E(t) is defined, with a minimum above the background noise, and possibly also a maximum to avoid taking into account false impulses originating in stacks of photons, often called coincidences and received quasi-simultaneously by the detector 15.

The adaptation of the reference front duration $T_{FREF}$ allows having, as long as there is a flux of photons, constant auto-adaptation of the front duration of the reference form so that it corresponds to that of the real signal front. Optimal fidelity of the quantification of the amplitude of the front and therefore of the measurement of the energy of the incident photons is thus obtained.

The adaptation of the reference front duration $T_{FREF}$ allows stabilizing the measurements performed by the device when the response time of the detector 15 and of the processing chain 22 evolves. It is possible to further improve the measurements by tending to stabilize the response time itself.

For its operation, a polarization signal is applied to the detector 15. In the case of a semiconductor crystal, the polarization signal is a voltage which can typically range from a few hundred volts to 2 kilovolts. More precisely, a received photon generates charges in the crystal and the polarization voltage allows the transit of the charges generated toward the electrodes. The polarization voltage is called $U_{HT}$ or high voltage. In practice, the signal front duration $T_{FSIG}$ evolves as a function of the electrical field applied to the crystal due to the presence of the high voltage $U_{HT}$. More precisely, the signal front duration $T_{FSIG}$ depends mainly on the electric field inside the crystal. With a constant polarization voltage, variations of the electric field are observed, in particular during starting of the device.

To maintain the signal front duration $T_{FSIG}$ as close as possible to a nominal reference duration $T_{FREFO}$, it is possible to adjust the high voltage $U_{HT}$. In other words, the processing chain 22 comprises a second feedback loop of the high voltage $U_{HT}$ as a function of a deviation between the reference front duration $T_{FREF}$ and the nominal reference front duration $T_{FREFO}$.

Previously, attempts were made to act on the high voltage $U_{HT}$ but only to attempt to accelerate the stabilization of the detector, not to hold constant the signal front duration $T_{FSIG}$.

This second feedback loop of the high voltage $U_{HT}$ is in addition to the first feedback loop of the reference signals described above. Not only is the amplitude of the signal determined by correlation with a reference signal selected as a function of the real front duration $T_{FSIG}$ and complementarily, the detector itself is acted upon to maintain the real front duration $T_{FSIG}$ as constant as possible.

Alternatively, it is possible to implement the second feedback loop without the first loop. More precisely, the polarization signal can be servo-controlled by a variable representing the real front duration $T_{FSIG}$. The variable can be a measurement of the rise time of the signal originating in the processing chain 22. It is also possible to implement the reference data base 42 with a single signal and to use the quality factor of the correlation, in this case the parameter B(t), to servo-control the high voltage $U_{HT}$.

The second feedback loop comprises a comparator 55 of the reference front duration $T_{FREF}$ and of the nominal reference front duration $T_{FREFO}$. At the output of the comparator 55 an error signal ε of the second feedback loop is available. A multiplier 57 allows multiplying the error signal ε by a servo control coefficient $k_{HTAA}$. The voltage $U_{HT}$ is corrected by means of an adder 59 adding to a current value of the voltage $U_{HT}$ a corrector equal to the result of the multiplication. More precisely, to the current value of $U_{HT}$. In other words:

$$U_{HT}=U_{HT}+k_{HTAA}\cdot(T_{FREF}-T_{FREFO})$$

In practice, $U_{HT}$ can represent a control value proportional to the polarization voltage actually applied to the detector. It is possible to refine the modification of the current value of $U_{HT}$ by applying a correction $k_{HTAA}$ of the proportional, integral and/or derivative type. The coefficients of this type of correction are determined in order to improve the stability/speed compromise.

The second feedback loop allows retaining a good quantification of the energies under all circumstances, even during the phases of stabilization of the detector or of stabilization of temperature. The only limitation is the range of $U_{HT}$ voltage acceptable for the proper operation of the detector 15.

The selection of the nominal target value $T_{FREFO}$ can be accomplished definitively depending on the detector 15 selected. Alternatively, to further improve the performance of the device with respect to the physical characteristics of the detector 15, it is also possible to use a target value $T_{FREFO}$ which depends, for example, on the ambient temperature, on the high voltage $U_{HT}$ applied, or on other physical parameters linked to the detector 15.

The two feedback loops can interfere with one another and cause an instability in the energy measurements E(t). Advantageously, a time constant of the second feedback loop is stronger than that of the first loop. In other words, starting from a nominal target value $T_{FREFO}$ of the reference form front duration, the absolute value of voltage $U_{HT}$ is progressively adjusted until it converges so that $T_{FREF}-T_{FREFO}$ is zero on average over a long period of time. The modification of series of reference forms by means of the first feedback loop has, for its part, a weaker reaction time.

Figure 5:
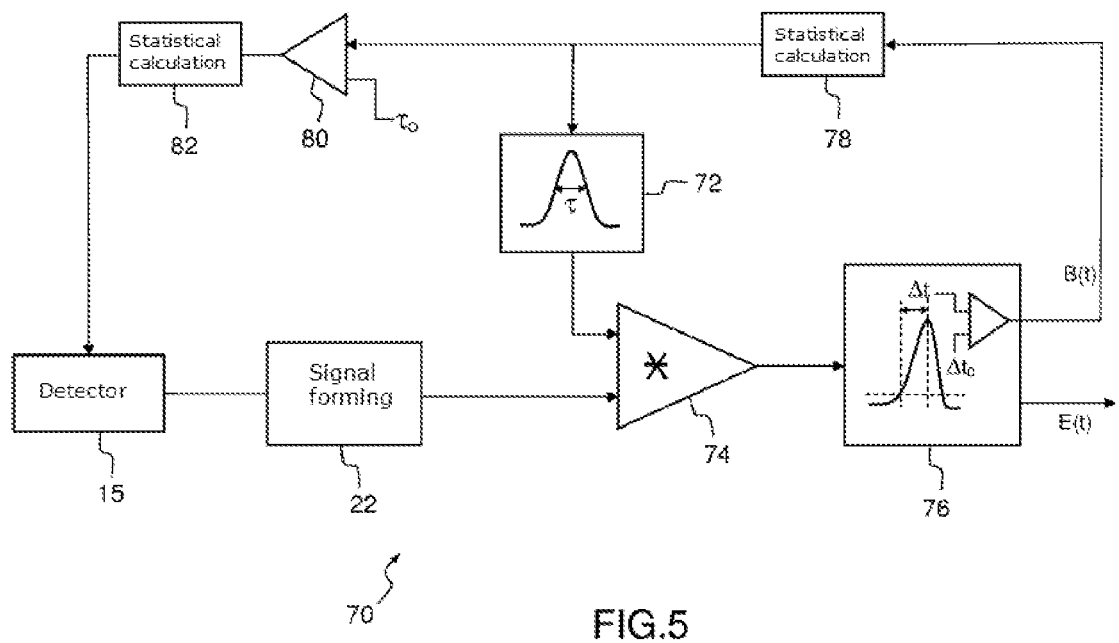
FIG. 5 shows schematically another example of a spectrometry device implementing the invention.

FIG. 5 shows schematically another example of a spectrometry device 70 according to the invention and capable of being installed in the system 10. In the device 70 is found a detector 15 and the associated processing chain 22. The reference database bears the label 72 here. This is a temporal filter, for example a Gaussian filter, of which the time constant τ is configurable. The comparator here is a convolution operator 74 allowing the application of the filter to the signal originating from the processing chain 22. In other words, the comparison accomplished by the comparator consists of applying the filter to the electrical signal originating in the detector 15. Convolution is a form of comparison. The block 76 corresponds to the blocks 45 and 46 described previously and allowing calculation of the quality factor B(t) and energy E(t). The quality factor B(t) is for example a deviation between the rise time of the filtered signal originating in the comparator 74 and a reference rise time. The energy E(t) is for example the amplitude of the filtered signal. In the first feedback loop a block 78 corresponding to the multiplier 52 and to the adder 50 allows adapting the time constant T of the reference database 72 to obtain the optimum value of the quality factor, in this case a zero value of B(t). Here too a coefficient $k_{FAA}$ is to be adjusted according to a stability/speed compromise. As in the first example, it is possible to refine the value of the time constant T by applying a correction of the proportional, integral and/or derivative type. The coefficients of this type of correction are determined so as to improve the stability/speed compromise.

As in the first example, a second feedback loop can act on a polarization signal of the detector 15 so as to maintain the time constant τ as close as possible to a reference time constant $τ_O$. A comparator 80 corresponds to the comparator 55 and a block 82 assumes the functions of the multiplier 57 and the adder 59.

The invention claimed is:

1. A spectrometry device for a beam of photons, the device comprising:
   a detector configured to receive the beam and to deliver at an output an electrical signal that is a function of the energy of each photon of the beam (X) received,
   a reference database configurable by means of a first parameter,
   a comparator with two inputs and two outputs, the comparator receiving at its first input the electrical signal that is a function of an energy of a current photon, and at its second input a reference signal delivered by the reference database, the comparator being configured to establish a comparison between the electrical signal and the reference signal, the comparator delivering at its first output a signal (E(t)) representing the energy of each photon of the beam and at its second output a quality factor (B(t)) of the comparison, and a feedback loop allowing adapting the first parameter of the reference database so as to optimize the quality factor (B(t)), the feedback loop intervening only to refine the determination of the signal (E(t)) representing the energy of the later photons of the beam (X) by adapting the first parameter of the reference database, the feedback loop not involved in determining the energy of the current photon.

2. The device according to claim 1, wherein the comparator is configured to establish a comparison between the electrical signal that is a function of the energy of a photon and the reference signal selected in the base as a function of a value of the first parameter defined based on the values of the quality factor (B(t)) delivered by the comparator receiving at its first input the electrical signal that is a function of the energy of photons preceding the current photon, and giving at the output a signal (E(t)) representing the energy of the current photon.

3. The device according to claim 1, further comprising:
an amplifier of the integrator type comprising one input and one output, the input of the amplifier being connected to the output of the detector, and in that the reference database is configured to generate several forms of signals, each corresponding to the front duration ($T_{FSIG}$) of a signal delivered by the amplifier in response to the reception of a photon by the detector.

4. The device according to claim 2, wherein the reference database is configured to associate with each form of signal a reference front duration ($T_{FREF}$) forming the first parameter of the reference database, the feedback loop servo-controlling the reference front duration ($T_{FREF}$) based on the front duration ($T_{FSIG}$) of a signal delivered by the amplifier in response to the reception of a photon by the detector.

5. The device according to claim 4, wherein the signal (B(t)) representing the quality of the comparison represents a deviation between the front duration ($T_{FSIG}$) of a signal delivered by the amplifier and the reference front duration ($T_{FREF}$) associated with the form of the signals received by the comparator and in that the feedback loop from the reference front duration ($T_{FREF}$) to the front duration ($T_{FSIG}$) of a signal delivered by the amplifier is configured to modify the reference front duration ($T_{FREF}$) in order to change the reference form as a function of the value of the signal (B(t)) representing the quality of the comparison.

6. The device according to claim 5, wherein the feedback loop from the reference front duration ($T_{FREF}$) to the front duration ($T_{FSIG}$) of a signal delivered by the amplifier comprises a multiplier of the representative value (B(t)) by a gain constant ($k_{FAA}$) and an adder adding a result originating in the multiplier to the current value of the reference front duration ($T_{FREF}$).

7. The device according to claim 2, further comprising:
a subtractor with two inputs and one output, connected at a first of its inputs to the output of the amplifier, the output of the subtractor delivering the electrical signal, and
a delay line connected between the output of the amplifier and a second of the two inputs of the subtractor, and in that the delay line is configurable by means of its delay duration ($T_{LAR}$) and in that the reference database is configurable by means of a second parameter formed by the delay duration ($T_{LAR}$).

8. The device according to claim 1, wherein the reference database delivers a temporal filter configured by a time constant, in that the comparison consists of applying the filter to the electrical signal, the signal (B(t)) representing the quality of the comparison being a difference between a rise time of the filtered signal and a reference rise time, the feedback loop tending to cancel the signal (B(t)) representing the quality of the comparison.

9. The device according to claim 1, wherein the detector is polarized by means of a polarization signal ($U_{HT}$) and in that the device comprises a feedback loop of the polarization signal ($U_{HT}$) as a function of a deviation between a first current parameter ($T_{FREF}$) and a first nominal parameter ($T_{FREFO}$).

10. The device according to claim 9, wherein the feedback loop of the polarization signal ($U_{HT}$) comprises a multiplier of the deviation between the first current parameter ($T_{FREF}$) and the first nominal parameter ($T_{FREFO}$) by a gain constant ($k_{HTAA}$) and an adder adding a result originating in the multiplier to the current value of the polarization signal ($U_{HT}$).

11. The device according to, claim 9, wherein a time constant of the feedback loop of the polarization signal ($U_{HT}$) is stronger than a time constant of the feedback loop of the first parameter ($T_{FREF}$) of the reference database.

12. A spectrometry device for a beam of photons, the device comprising:
a detector configured to receive the beam and to deliver at an output an electrical signal that is a function of the energy of each photon of the beam (X) received,
a reference database configurable by means of a first parameter,
a comparator with two inputs and two outputs, the comparator receiving at its first input the electrical signal, and at its second input a reference signal delivered by the reference database, the comparator being configured to establish a comparison between the electrical signal and the reference signal, the comparator delivering at its first output a signal (E(t)) representing the energy of each photon of the beam and at its second output a quality factor (B(t)) of the comparison, wherein the comparator is configured to establish a comparison between the electrical signal that is a function of the energy of a photon and the reference signal selected in the base as a function of a value of the first parameter defined based on the values of the quality factor (B(t)) delivered by the comparator receiving at its first input the electrical signal that is a function of the energy of photons preceding the current photon, and giving at the output a signal (E(t)) representing the energy of the current photon, and
a feedback loop allowing adapting the first parameter of the reference database so as to optimize the quality factor (B(t)), the feedback loop intervening only to refine the determination of the signal (E(t)) representing the energy of the later photons of the beam (X).

13. The device according to claim 12, wherein the reference database is configured to associate with each form of signal a reference front duration ($T_{FREF}$) forming the first parameter of the reference database, the feedback loop servo-controlling the reference front duration ($T_{FREF}$) based on the front duration ($T_{FSIG}$) of a signal delivered by the amplifier in response to the reception of a photon by the detector.

14. The device according to claim 13, wherein the signal (B(t)) representing the quality of the comparison represents a deviation between the front duration ($T_{FSIG}$) of a signal delivered by the amplifier and the reference front duration ($T_{FREF}$) associated with the form of the signals received by the comparator and in that the feedback loop from the reference front duration ($T_{FREF}$) to the front duration ($T_{FSIG}$) of a signal delivered by the amplifier is configured to modify the reference front duration ($T_{FREF}$) in order to change the reference form as a function of the value of the signal (B(t)) representing the quality of the comparison.

15. The device according to claim 14, wherein the feedback loop from the reference front duration ($T_{FREF}$) to the front duration ($T_{FSIG}$) of a signal delivered by the amplifier comprises a multiplier of the representative value (B(t)) by a gain constant ($k_{FAA}$) and an adder adding a result originating in the multiplier to the current value of the reference front duration ($T_{FREF}$).

16. The device according to claim 12, further comprising:
 a subtractor with two inputs and one output, connected at a first of its inputs to the output of the amplifier, the output of the subtractor delivering the electrical signal, and
 a delay line connected between the output of the amplifier and a second of the two inputs of the subtractor, and in that the delay line is configurable by means of its delay duration ($T_{LAR}$) and in that the reference database is configurable by means of a second parameter formed by the delay duration ($T_{LAR}$).

17. A spectrometry device for a beam of photons, the device comprising:
 a detector configured to receive the beam and to deliver at an output an electrical signal that is a function of the energy of each photon of the beam (X) received, wherein the detector is polarized by means of a polarization signal ($U_{HT}$) and in that the device comprises a feedback loop of the polarization signal ($U_{HT}$) as a function of a deviation between a first current parameter ($T_{FREF}$) and a first nominal parameter ($T_{FREFO}$),
 a reference database configurable by means of a first parameter,
 a comparator with two inputs and two outputs, the comparator receiving at its first input the electrical signal, and at its second input a reference signal delivered by the reference database, the comparator being configured to establish a comparison between the electrical signal and the reference signal, the comparator delivering at its first output a signal (E(t)) representing the energy of each photon of the beam and at its second output a quality factor (B(t)) of the comparison, and
 a feedback loop allowing adapting the first parameter of the reference database so as to optimize the quality factor (B(t)), the feedback loop intervening only to refine the determination of the signal (E(t)) representing the energy of the later photons of the beam (X).

18. The device according to claim 17, wherein the feedback loop of the polarization signal ($U_{HT}$) comprises a multiplier of the deviation between the first current parameter ($T_{FREF}$) and the first nominal parameter ($T_{FREFO}$) by a gain constant ($k_{HTAA}$) and an adder adding a result originating in the multiplier to the current value of the polarization signal ($U_{HT}$).

19. The device according to claim 17, wherein a time constant of the feedback loop of the polarization signal ($U_{HT}$) is stronger than a time constant of the feedback loop of the first parameter ($T_{FREF}$) of the reference database.

* * * * *